United States Patent
Shigeeda (10) Patent No.: US 9,306,901 B2
(45) Date of Patent: Apr. 5, 2016

(54) IP ADDRESS DISTRIBUTION SYSTEM AND IP ADDRESS DISTRIBUTION METHOD

(75) Inventor: Tetsuya Shigeeda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 207 days.

(21) Appl. No.: 14/346,567

(22) PCT Filed: Sep. 26, 2011

(86) PCT No.: PCT/JP2011/071917
§ 371 (c)(1),
(2), (4) Date: Mar. 21, 2014

(87) PCT Pub. No.: WO2013/046304
PCT Pub. Date: Apr. 4, 2013

(65) Prior Publication Data
US 2014/0222982 A1    Aug. 7, 2014

(51) Int. Cl.
*G06F 15/177* (2006.01)
*H04L 29/12* (2006.01)
*H04L 12/46* (2006.01)

(52) U.S. Cl.
CPC ........ *H04L 61/2007* (2013.01); *H04L 61/2015* (2013.01); *H04L 12/462* (2013.01); *H04L 61/103* (2013.01); *H04L 61/2038* (2013.01); *H04L 61/6004* (2013.01)

(58) Field of Classification Search
USPC ......................................... 709/222, 203, 226
See application file for complete search history.

(56) References Cited

U.S. PATENT DOCUMENTS

| | | | |
|---|---|---|---|
| 2009/0245132 A1* | 10/2009 | Beser | H04L 12/4645 370/254 |
| 2011/0280158 A1* | 11/2011 | Shigeeda | H04L 29/12028 370/255 |
| 2011/0286464 A1 | 11/2011 | Shigeeda et al. | |

(Continued)

FOREIGN PATENT DOCUMENTS

| | | |
|---|---|---|
| JP | 2006-237790 A | 9/2006 |
| WO | WO 2010/087258 A1 | 8/2010 |
| WO | WO 2011/074123 A1 | 6/2011 |

OTHER PUBLICATIONS

Office Action (Notice of Rejection) issued on Mar. 1, 2012, by the Japanese Patent Office in corresponding Japanese Patent Application No. 2012-502338, and an English Translation of the Office Action. (6 pages).

(Continued)

*Primary Examiner* — El Hadji Sall
(74) *Attorney, Agent, or Firm* — Buchanan Ingersoll & Rooney PC (57) ABSTRACT

An IP address distribution system according to the present invention includes a network including a plurality of switches, and an IP address distribution apparatus connected to the network, in which each of the switches holds therein arrangement information that indicates a position thereof in the network, and when receiving an IP-address request signal from one of, devices connected thereto, adds the held arrangement information to the IP-address request signal and transfers the IP-address request signal, and when receiving an IP-address request signal, the IP address distribution apparatus selects an IP address from a range corresponding to the arrangement information added to the signal and distributes the selected IP address to a request source device.

13 Claims, 6 Drawing Sheets

(56) References Cited

U.S. PATENT DOCUMENTS

2012/0166601 A1* 6/2012 Wittenschlaeger ..... H04L 12/66 709/221
2012/0263179 A1 10/2012 Shigeeda et al.

OTHER PUBLICATIONS

Patrick, M., "DHCP Relay Agent Information Option", Motorola BCS, Jan. 2001, pp. 1-15.

European Search Report dated Jan. 16, 2015 issued in corresponding European Patent Appln. No. 11872932.6 (6 pages).
International Search Report (PCT/ISA/210) mailed on Oct. 18, 2011, by the Japanese Patent Office as the International Searching Authority for International Application No. PCT/JP2011/071917.
Written Opinion (PCT/ISA/237) mailed on Oct. 18, 2011, by the Japanese Patent Office as the International Searching Authority for International Application No. PCT/JP2011/071917.
Internetworking with TCP/IP vol. 1, 4th edition, by Douglas E. Comer (Kyoritsu Shuppan).

* cited by examiner

| ARRANGEMENT INFORMATION | DATA UNIT (DEVICE INFORMATION) | IP ADDRESS |
|---|---|---|
| 1 | AIR CONDITIONER | 192.168.1.1 |
| | BRAKING DEVICE | 192.168.1.2 |
| | OTHERS | 192.168.1.3 TO 192.168.1.254 |
| 2 | AIR CONDITIONER | 192.168.2.1 |
| | BRAKING DEVICE | 192.168.2.2 |
| | OTHERS | 192.168.2.3 TO 192.168.2.254 |

| TRANSMISSION DESTINATION INFORMATION |
|---|
| TRANSMISSION SOURCE INFORMATION |
| ARRANGEMENT INFORMATION |
| PHYSICAL PORT |
| DATA |

FIG.10

| ARRANGEMENT INFORMATION | PHYSICAL PORT | IP ADDRESS |
|---|---|---|
| 1 | P1 | 192.168.1.1 |
| | P2 | 192.168.1.2 |
| | P3 | 192.168.1.3 |
| | P4 | 192.168.1.4 |
| | P5 | 192.168.1.5 |
| | OTHERS | 192.168.1.6 TO 192.168.1.254 |
| 2 | P1 | 192.168.2.1 |
| | P2 | 192.168.2.2 |
| | P3 | 192.168.2.3 |
| | P4 | 192.168.2.4 |
| | P5 | 192.168.2.5 |
| | OTHERS | 192.168.2.6 TO 192.168.2.254 |
| OTHERS | | 192.168.3.1 TO 192.168.3.254 |

IP ADDRESS DISTRIBUTION SYSTEM AND IP ADDRESS DISTRIBUTION METHOD

FIELD

The present invention relates to IP address distribution, and more particularly to an IP address distribution system and an IP address distribution method used in a train including a plurality of cars.

BACKGROUND

TCP/IP often used as a communication protocol between apparatuses uses IP addresses as information for identifying the apparatuses. When TCP/IP is used, IP addresses uniquely defined need to be allocated to apparatuses on a network, respectively.

As a method of determining an IP address for each of apparatuses on a network, a method in which an IP address is provided to each of the apparatuses without any overlap, the IP address is recorded in a recording device included in each of the apparatuses, and each of the apparatuses uses the recorded IP address at the time of startup is employed.

As another method of determining an IP address for each of apparatuses on a network, a RARP (Reverse Address Resolution Protocol) is used. When the RARP is applied, each of the apparatuses performs broadcast transmission of an RARP message to the network at the time of startup. In response to the RARP message, an RARP server on the network distributes an IP address to the transmission source apparatus via the network.

There are also a BOOTP (Boots Trap Protocol) and a DHCP (Dynamic Host Configuration Protocol) as IP address distribution methods alternative to the RARP. In either scheme, a server that manages IP addresses distributes an IP address in response to a request from an apparatus, thereby determining the IP address (see, for example, Non Patent Literature 1).

CITATION LIST

Non Patent Literature

Non Patent Literature 1: Internetworking with TCP/IP Vol. 1, 4th edition, by Douglas E. Comer (Kyoritsu Shuppan)

SUMMARY

Technical Problem

In the IP address distribution methods mentioned above, a server that has received an IP-address distribution request assigns an IP address to a request source device. However, because IP address assignment is not performed considering a physical configuration of the network, the following problems occur.

For example, a case where TCP/IP is used in a network having a device configuration previously designed is considered. In this network, arrangement of network devices is already defined and thus, when apparatus replacement is required due to a malfunction of an apparatus, it is preferable for the network operation that the same (or a relevant) IP address as that having been provided to the malfunctioning apparatus is provided to the corresponding apparatus after the replacement according to device arrangement. When an IP address is provided according to the device arrangement, convenience is improved in management of the devices. For example, when a communication failure occurs, involved devices can be easily specified. To provide the same or relevant IP address as that having been provided to an apparatus before replacement to an apparatus after the replacement, an operator writes a desired IP address during apparatus installation. However, if an IP address corresponding to an installation position can be provided automatically after apparatus replacement, ease of the operation is improved. Although an operation error may occur when setting is manually performed by a person, the operation error can be prevented by automation. Therefore, it is desirable that an IP address corresponding to the device arrangement is distributed automatically when an apparatus is installed.

The present invention has been achieved in view of the problems mentioned above, and an object of the present invention is to provide an IP address distribution system and an IP address distribution method that, when an apparatus to which an IP address is not provided is newly installed due to apparatus replacement or the like, can provide an IP address corresponding to an installation position to the newly-installed apparatus.

Solution to Problem

The present invention is directed to an IP address distribution system and an IP address distribution method that achieve the object. The IP address distribution system includes a network including a plurality of switch apparatuses; and an IP address distribution apparatus connected to the network, wherein each of the switch apparatuses holds therein arrangement information that indicates a position thereof in the network, and when receiving an IP-address request signal from a device connected thereto, adds the held arrangement information to the IP-address request signal and transfers the IP-address request signal; and wherein when receiving an IP-address request signal, the IP address distribution apparatus selects an IP address from a range corresponding to the arrangement information added to the signal and distributes the selected IP address to a request source device.

Advantageous Effects of Invention

According to the present invention, when receiving an IP-address request signal from a device connected thereto, each of the switching apparatuses adds the held arrangement information to the IP-address request signal and transfers the IP-address request signal, and, when receiving an IP-address request signal, the IP address distribution apparatus selects an undistributed IP address from a range corresponding to the added arrangement information and distributes the selected IP address. Therefore, an IP address can be distributed according to a position on a physical wire on the network (an installation position of the device).

DESCRIPTION OF EMBODIMENTS

Exemplary embodiments of an IP address distribution system and an IP address distribution method according to the present invention will be explained below in detail with reference to the accompanying drawings. The present invention is not limited to the embodiments.

First Embodiment

Figure 1:
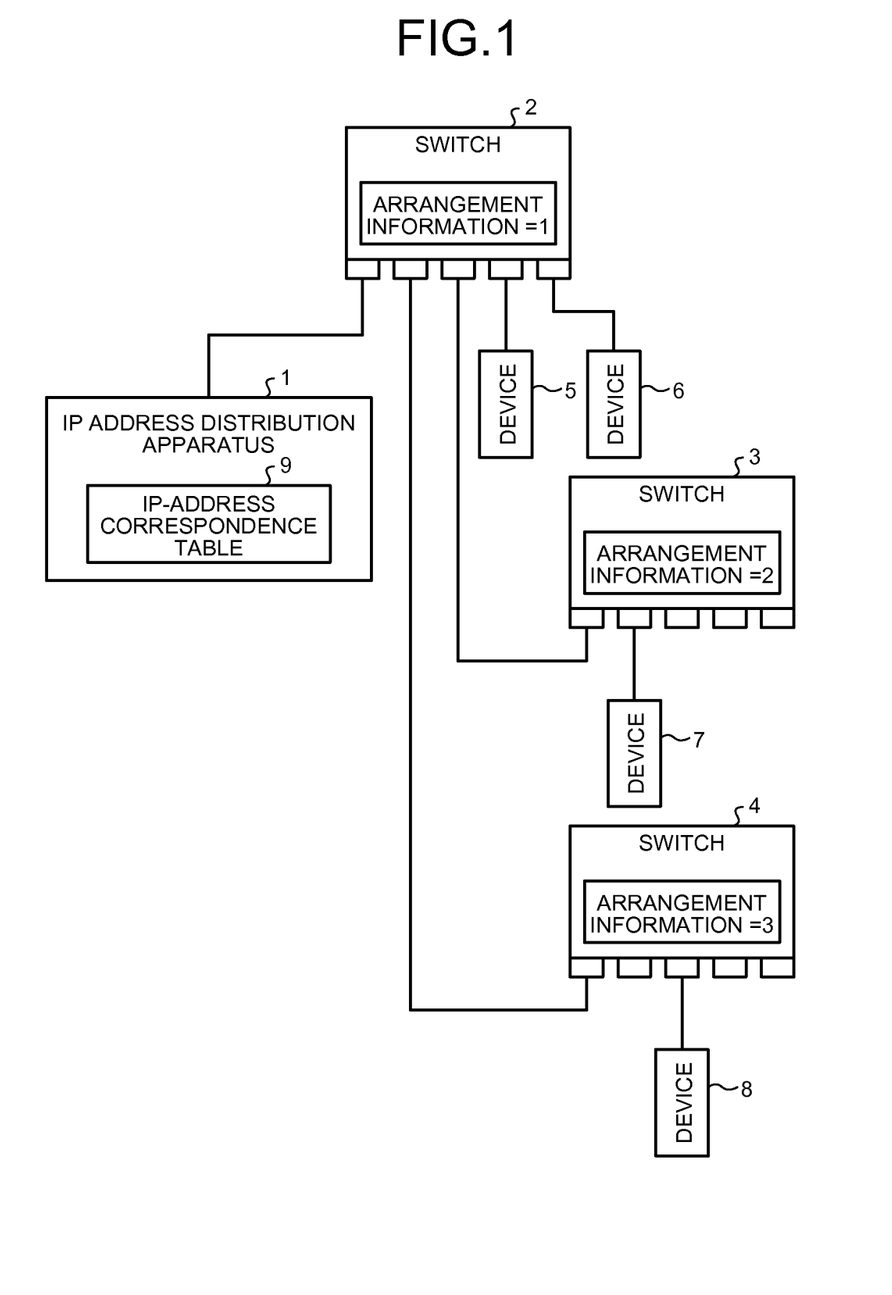
FIG. 1 is a configuration example of an IP address distribution system according to a first embodiment.

FIG. 1 is a configuration example of an IP address distribution system according to a first embodiment. The IP address distribution system according to the present embodiment is configured to include an IP address distribution apparatus 1 and switches 2 to 4 serving as Ethernet® switches, respectively. The IP address distribution apparatus 1 is connected to the switch 2. The switches 3 and 4 are connected to the switch 2. Devices 5 and 6 are connected to the switch 2, a device 7 is connected to the switch 3, and a device 8 is connected to the switch 4. The devices 5 to 8 are apparatuses that request assignment of an IP address to the IP address distribution apparatus 1 and are assigned with IP addresses, respectively. The IP address distribution apparatus 1 holds therein an IP-address correspondence table 9 and distributes (assigns) an IP address according to the IP-address correspondence table 9 upon reception of a distribution request on an IP address.

Each of the switches has arrangement information that indicates a position where the switch is installed (a position on a physical wire of the network). In the example of FIG. 1, the switch 2 has a value 1 as the arrangement information, the switch 3 has a value 2 as the arrangement information, and the switch 4 has a value 3 as the arrangement information.

Figure 2:
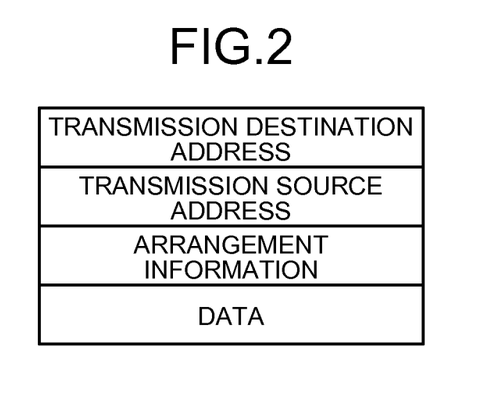
FIG. 2 is a configuration example of an IP-address request signal.

FIG. 2 is a configuration example of an IP-address request signal that is transmitted to the IP address distribution apparatus 1 when the devices 5 to 8 request IP address distribution in the IP address distribution system according to the present embodiment. As shown in FIG. 2, the IP-address request signal has areas in which transmission destination information, transmission source information, arrangement information, and data is stored, respectively. Information of a destination and information of a transmission source of the IP-address request signal is stored in the transmission destination information area and the transmission source area, respectively. Arrangement information held by a switch that first relays the IP-address request signal is stored in the arrangement information area.

Figure 3:
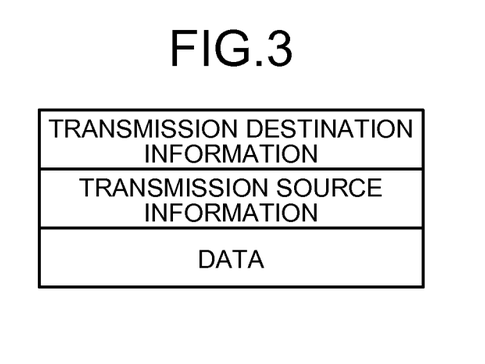
FIG. 3 is a configuration example of an IP-address distribution signal.

FIG. 3 is a configuration example of an IP-address distribution signal that is transmitted by the IP address distribution apparatus 1 having received the IP-address request signal to distribute an IP address to a request source device in the IP address distribution system according to the present embodiment. As shown in FIG. 3, the IP-address distribution signal has areas in which transmission destination information, transmission source information, and data is stored, respectively. Information of a destination and information of a transmission source of the IP-address distribution signal is stored in the transmission destination information area and the transmission source area, respectively. An IP address to be distributed to a request source device is stored in the data area.

Figure 4:
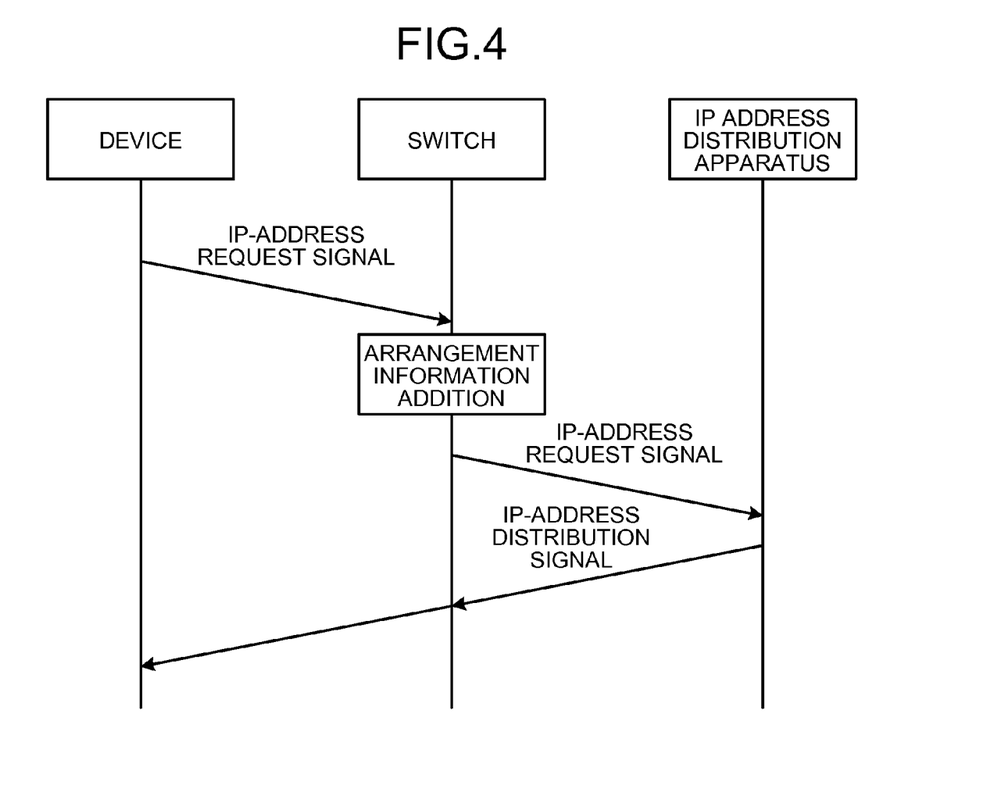
FIG. 4 is a sequence diagram of an IP address distribution procedure performed in the IP address distribution system according to the first embodiment.

An operation to assign an IP address in the IP address distribution system according to the present embodiment is explained with reference to FIG. 4. FIG. 4 is a sequence diagram of an IP address distribution procedure performed in the IP address distribution system according to the first embodiment.

When requesting assignment of an IP address, each of the devices transmits an IP-address request signal that specifies a broadcast address as a transmission destination address to all apparatuses connected to the network. Unique information of the device is set as the transmission source information of the IP-address request signal. The IP-address request signal is transmitted with the arrangement information area in blank. The data area of the IP-address request signal is not used in the present embodiment.

Each of the switches has a function as a switching hub and, upon reception of the IP-address request signal, transfers the signal to ports other than a port through which the signal has been received. At that time, the switch checks the arrangement information area of the IP-address request signal. When no arrangement information is set in the area, the switch sets the arrangement information held thereby in the area and then transfers the signal. When arrangement information is already set in the arrangement information area, the switch transfers the signal as it is. This process is repeated by each of the switches, so that the IP-address request signal reaches the IP address distribution apparatus 1. Arrangement information held by a switch to which the request source device is connected is set in the arrangement information area of the IP-address request signal received by the IP address distribution apparatus 1.

Upon reception of the IP-address request signal, the IP address distribution apparatus 1 determines an IP address to be distributed and transmits an IP-address distribution signal as a signal for notifying a determination result. The unique information of the request source device (the unique information set as the transmission source information in the received IP-address request signal) is set as the transmission destination information of the IP-address distribution signal. Details of an operation to distribute (assign) an IP address performed by the IP address distribution apparatus 1 are explained later.

Upon reception of the IP-address distribution signal, each of the switches performs a transfer process according to the set transmission destination information. In this way, the IP-address distribution signal reaches the target device (the request source device).

When receiving the IP-address distribution signal addressed thereto, each of the devices sets the IP address set in the data area as the own IP address and starts an IP communication.

An operation performed by the IP address distribution apparatus 1 having received an IP-address request signal to assign an IP address to a request source device is explained below.

Figure 5:
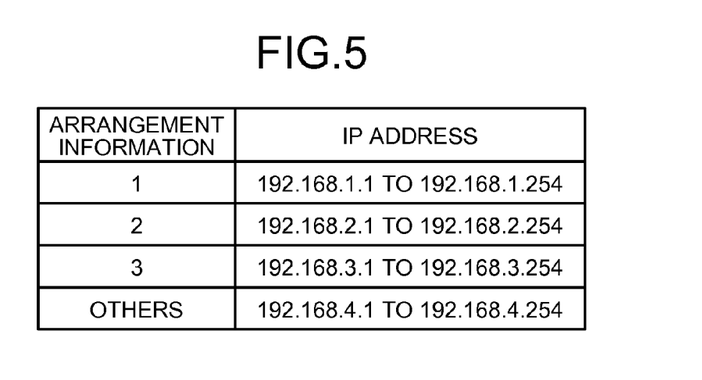
FIG. 5 is an example of the IP-address correspondence table.

FIG. 5 is an example of the IP-address correspondence table 9 held by the IP address distribution apparatus 1. The example shown in FIG. 5 indicates that undistributed one of IP addresses "192.168.1.1 to 192.168.1.254" is selected and distributed when the arrangement information is "1", undistributed one of IP addresses "192.168.2.1 to 192.168.2.254"

is selected and distributed when the arrangement information is "2", undistributed one of IP addresses "192.168.3.1 to 192.168.3.254" is selected and distributed when the arrangement information is "3", and undistributed one of IP addresses "192.168.4.1 to 192.168.4.254" is selected and distributed when the arrangement information is "other (other than 1, 2, and 3)". IP addresses "192.168.4.0" and "192.168.4.255" are used as a network address and a broadcast address, respectively (when an address mask is "255.255.255.0") and thus are not distributed.

Upon reception of an IP-address request signal, the IP address distribution apparatus 1 determines an IP address to be distributed using the arrangement information added to the IP-address request signal and the held IP-address correspondence table 9. Upon determination of an IP address, the IP address distribution apparatus 1 sets the transmission source information set in the received IP-address request signal as the transmission destination information of the IP-address distribution signal, sets unique information of the IP address distribution apparatus 1 as the transmission source information of the IP-address distribution signal, sets the IP address to be distributed in the data area shown in FIG. 3, and transmits the IP-address distribution signal.

For example, when the device 5 transmits an IP-address request signal, the value of the arrangement information of the IP-address request signal received by the IP address distribution apparatus 1 is "1" (see FIG. 1). Accordingly, the IP address distribution apparatus 1 selects one of the IP addresses "192.168.1.1 to 192.168.1.254" corresponding to the arrangement information "1" and being undistributed at that time. Explanations are continued assuming that "192.168.1.1" is selected in this case. After completion of selection, the IP address distribution apparatus 1 transmits an IP-address distribution signal including data of the selected IP address to the device 5. When the device 6 transmits an IP-address request signal thereafter, the IP address distribution apparatus 1 receives the IP-address request signal having the arrangement information "1". Therefore, the IP address distribution apparatus 1 selects, for example, "192.168.1.2" as a value other than "192.168.1.1" having already been distributed to the device 5, as an IP address corresponding to the arrangement information "1" and transmits an IP-address distribution signal including data of the selected IP address to the device 6.

Alternatively, as a scheme of IP address distribution performed between the IP address distribution apparatus and the devices in the IP address distribution system according to the present embodiment, the IP address distribution apparatus can perform an operation of a DHCP server and each of the devices can perform an operation of a DHCP client.

As described above, the IP address distribution system according to the present embodiment is configured to include the IP address distribution apparatus and one or more switches. Each of the switches holds the arrangement information and, when receiving an IP-address request signal from a device connected to the own switch (when receiving an IP-address request signal including no arrangement information), transfers the IP-address request signal after adding the held arrangement information. Upon reception of the IP-address request signal, the IP address distribution apparatus selects an undistributed IP address from a range corresponding to the added arrangement information and distributes the selected IP address. Therefore, an IP address can be distributed to correspond to a position (an installation position) of a device on a physical wire of the network. For example, even in a case where a device that receives distribution of an IP address is replaced due to a malfunction or the like, the same IP address as that of the device before replacement can be provided to a device after the replacement if the IP address having been provided to the malfunctioning device is opened at the time of the replacement or before the replacement. Even if the IP address having been provided to the malfunctioning device is not opened, an IP address with a value close to that having been provided to the device before replacement can be provided to the device after the replacement.

As a process of opening the IP address having been provided to the malfunctioning device, the IP address distribution apparatus can transmit a signal to each of devices to which an IP address has been already provided at a predetermined period to perform an inquiry and, if there is no response, open an IP address having been provided thereto, for example.

It is alternatively possible that, upon reception of an IP-address request signal, the IP address distribution apparatus transmits a signal having each of distributed IP addresses in a range corresponding to arrangement information added to the signal as a destination to inquire presence of devices (devices to which an IP address has been already provided) and, when there is a device not responding thereto, redistributes an IP address having been provided to the non-responding device to a device as the transmission source of the IP-address request signal. In this case, when a device is replaced, an IP address having been provided to the device before the replacement can be reliably provided to a device after the replacement.

Second Embodiment

Figure 6:
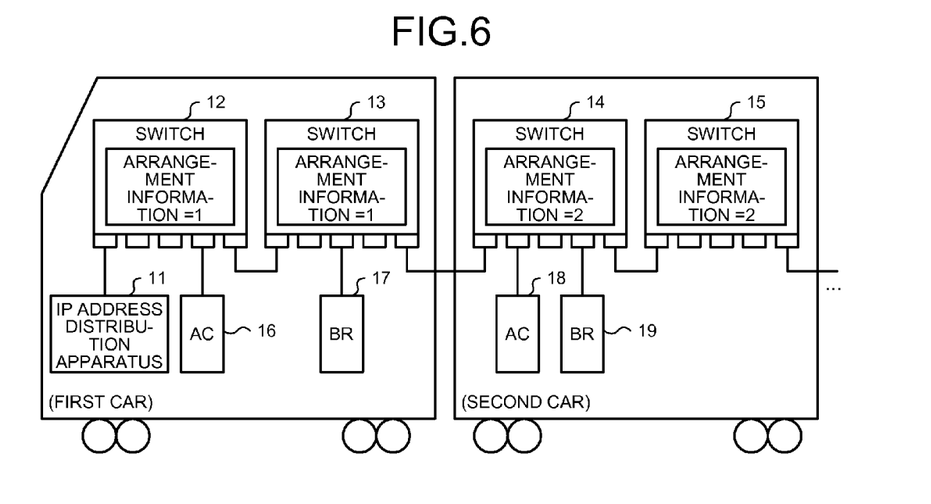
FIG. 6 is a configuration example of an IP address distribution system according to a second embodiment.

FIG. 6 is a configuration example of an IP address distribution system according to a second embodiment. The IP address distribution system according to the present embodiment is configured by mounting the IP address distribution apparatus and the switches explained in the first embodiment on a train and includes an IP address distribution apparatus 11 and switches 12 to 15. The IP address distribution apparatus 11 and the switches 12 and 13 are mounted on a first car and the switches 14 and 15 are mounted on a second car. The IP address distribution apparatus 11 is connected to the switch 12 and the switch 12 is connected to the switch 13. The switch 14 is connected to the switch 13 and the switch 15 is connected to the switch 14. An air conditioner (AC) 16 is connected to the switch 12 and a braking device (BR) 17 is connected to the switch 13. An air conditioner (AC) 18 and a braking device (BR) 19 are connected to the switch 14. The air conditioners 16 and 18 and the braking devices 17 and 19 operate as the devices that request distribution of an IP address explained in the first embodiment, respectively.

The IP address distribution apparatus 11 holds therein an IP-address correspondence table (not shown in FIG. 6) as in the first embodiment. Each of the switches of the present embodiment holds therein a value corresponding to a car in which the switch is installed as the arrangement information. As shown in FIG. 6, the switches 12 and 13 hold therein "1" as the arrangement information because the switches 12 and 13 are installed in the first car, and the switches 14 and 15 hold therein "2" as the arrangement information because the switches 14 and 15 are installed in the second car.

While only the first and second cars are described in FIG. 6, the same holds true for third and subsequent cars. While a case where the IP address distribution apparatus 11 is installed in the first car is shown, the IP address distribution apparatus 11 can be installed in a car other than the first car. The number of switches installed in each car is not limited to two. One switch or three or more switches can be installed according to the number of devices installed in a car, or the like. The numbers of installed switches can differ among cars.

An IP-address request signal transmitted by the air conditioners 16 and 18 and the braking devices 17 and 19 to the IP address distribution apparatus 11 has the same configuration as that in the first embodiment (see FIG. 2). An IP-address distribution signal also has the same configuration as that in the first embodiment (see FIG. 3). When requesting distribution of an IP address, each of the air conditioners 16 and 18 and the braking devices 17 and 19 transmits an IP-address request signal in which device information indicating the apparatus type thereof is set in the data area. Other points than transmission of an IP-address request signal in which device information is set in the data area are the same as those in the first embodiment.

Each of the switches operates in the same manner as in the first embodiment. That is, when receiving an IP-address request signal in which no arrangement information is set, each of the switches transfers the IP-address request signal after setting the arrangement information of the switch. When receiving an IP-address request signal in which arrangement information is set, each of the switches transfers the IP-address request signal as it is.

Figure 7:
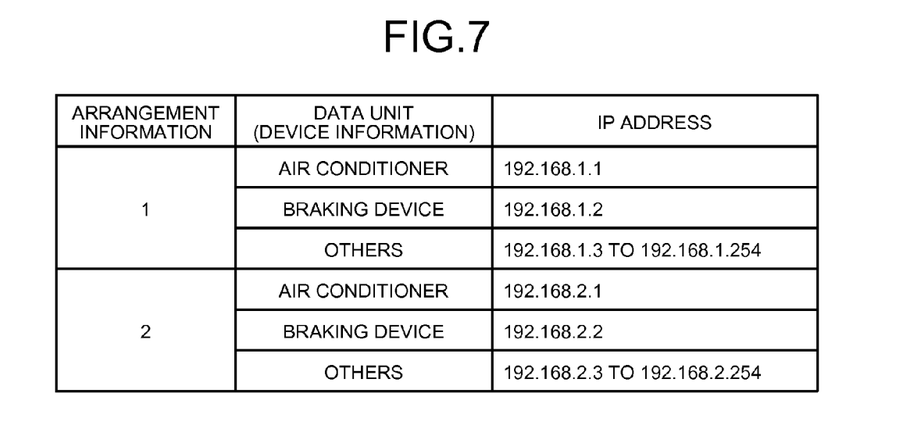
FIG. 7 is an example of an IP-address correspondence table.

Upon reception of an IP-address request signal, the IP address distribution apparatus 11 determines an IP address to be distributed based on the arrangement information and the device information set in the signal and the held IP-address correspondence table. Upon determination of an IP address, the IP address distribution apparatus 11 transmits an IP-address distribution signal in which transmission source information set in the received IP-address request signal is set as the transmission destination information, unique information of the IP address distribution apparatus 11 is set as the transmission source information of the IP-address distribution signal, and the IP address to be distributed is set in the data area. Details of an operation performed by the IP address distribution apparatus 11 to determine an IP address to be distributed are explained below.

FIG. 7 is an example of the IP-address correspondence table held by the IP address distribution apparatus 11. According to the IP-address correspondence table illustrated in FIG. 7, the IP address distribution apparatus 11 selects "192.168.1.1" as an IP address when receiving an IP-address request signal having the arrangement information "1" and the device information "air conditioner", selects "192.168.1.2" as an IP address when receiving an IP-address request signal having the arrangement information "1" and the device information "braking device", and selects undistributed one of IP addresses "192.168.1.3 to 192.168.1.254" when receiving an IP-address request signal having the arrangement information "1" and the device information "other" (in a case of a device different from the air conditioner and the braking device). The IP address distribution apparatus 11 selects "192.168.2.1" as an IP address when receiving an IP-address request signal having the arrangement information "2" and the device information "air conditioner", selects "192.168.2.2" as an IP address when receiving an IP-address request signal having the arrangement information "2" and the device information "braking device", and selects undistributed one of IP addresses "192.168.2.3 to 192.168.2.254" when receiving an IP-address request signal having the arrangement information "2" and the device information "other" (in a case of a device different from the air conditioner and the braking device).

While an example in which devices that receive distribution of an IP address are the air conditioners and the braking devices is shown in the present embodiment, devices that receive distribution of an IP address are not limited thereto. Alternatively, an IP address can be distributed without considering the type of a device but considering only the arrangement information as in the first embodiment.

As a scheme of IP address distribution between the IP address distribution apparatus and the devices in the IP address distribution system according to the present embodiment, the IP address distribution apparatus can perform an operation of a DHCP server and each of the devices can perform an operation of a DHCP client.

As described above, in the IP address distribution system according to the present embodiment, the air conditioner or the braking device as a device requesting distribution of an IP address transmits an IP-address request signal that includes the device information indicating the type of the own device. Upon reception of the IP-address request signal, each of the switches transfers the IP-address request signal after adding the arrangement information thereof if needed and the IP address distribution apparatus distributes an IP address corresponding to the device information and the arrangement information included in the received IP-address request signal. Accordingly, to a device requesting distribution of an IP address, an IP address corresponding to the type thereof can be provided. Because each of the switches holds therein a value uniquely indicating a car in which the switch is installed as the arrangement information, an IP address can be provided fixedly according to the car and according to the apparatus type. As a result, when an air conditioner or a braking device is replaced, an identical IP address to that having been provided to the device before replacement can be assigned to a device after the replacement.

Third Embodiment

Figure 8:
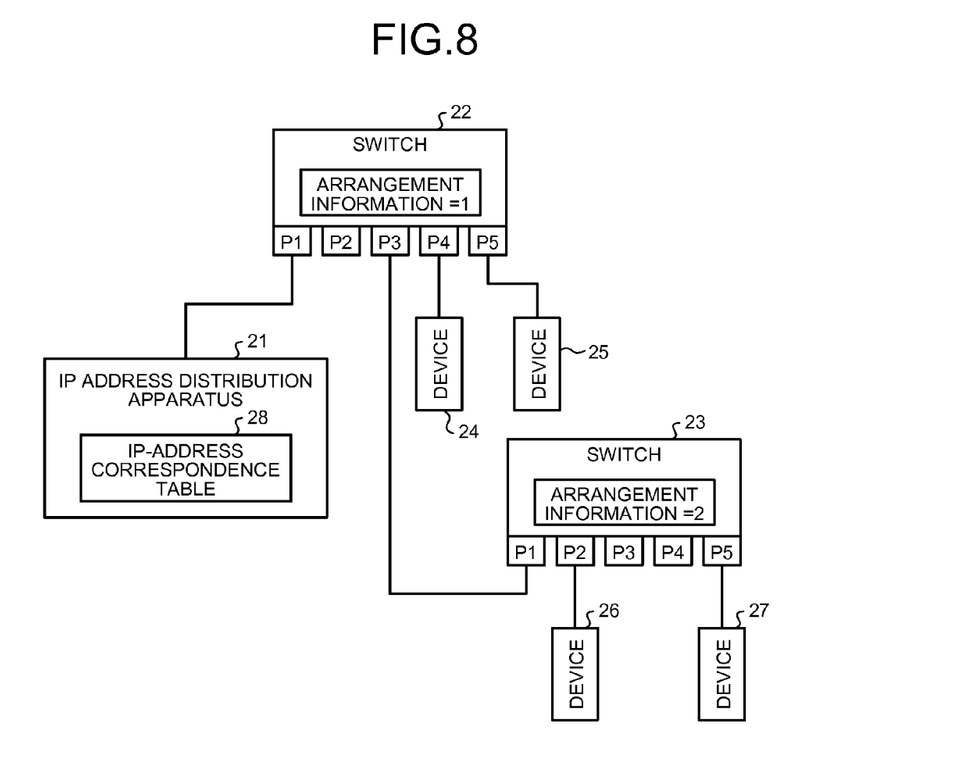
FIG. 8 is a configuration example of an IP address distribution system according to a third embodiment.

FIG. 8 is a configuration example of an IP address distribution system according to a third embodiment. The IP address distribution system according to the present embodiment is configured to include an IP address distribution apparatus 21 and switches 22 and 23. The IP address distribution apparatus 21 is connected to a physical port (hereinafter, simply "port") P1 of the switch 22. A port P1 of the switch 23 and a port P3 of the switch 22 are connected to each other. Devices 24 and 25 are connected to ports P4 and P5 of the switch 22, respectively, and devices 26 and 27 are connected to ports P2 and P5 of the switch 23, respectively. The IP address distribution apparatus 21 holds therein an IP-address correspondence table 28 and each of the switches holds therein identical arrangement information to that in the first and second embodiments. While an IP address is assigned based on the arrangement information of each of the switches in the IP address distribution system according to the first embodiment and an IP address is assigned based on the arrangement information of each of the switches and the type of a device in the IP address distribution system according to the second embodiment, an IP address is assigned based on the arrangement information of a switch to which a device serving as an IP address request source is connected and information of a connection port thereof in the IP address distribution system according to the present embodiment.

Figure 9:
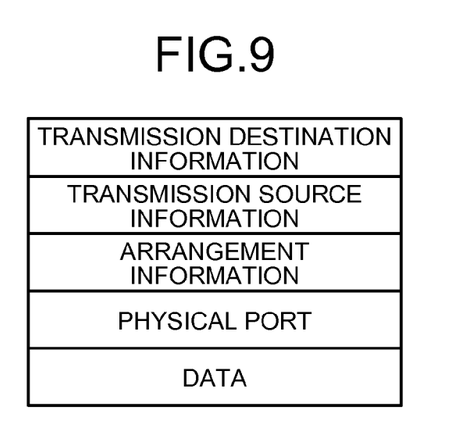
FIG. 9 is a configuration example of an IP-address request signal.

FIG. 9 is a configuration example of an IP-address request signal transmitted to the IP address distribution apparatus 21 when each of the devices 24 to 27 requests distribution of an IP address in the IP address distribution system according to the third embodiment. The IP-address request signal shown in FIG. 9 is obtained by adding an area for storing therein physical port information to the IP-address request signal of the first embodiment (see FIG. 2). An IP-address distribution signal transmitted by the IP address distribution apparatus 21 to distribute an IP address to each of the devices 24 to 27 has the same configuration as that of the first embodiment (see FIG. 3).

When requesting distribution of an IP address, each of the devices transmits an IP-address request signal with the configuration shown in FIG. 9. At that time, each of the devices transmits the IP-address request signal with no data set in the arrangement information area and the physical port area (in blank). The broadcast address is specified as transmission destination information of the IP-address request signal and unique information of a device that transmits the signal is set as the transmission source information.

Upon reception of the IP-address request signal, each of the switches transfers the IP-address request signal to ports other than a port through which the signal has been received. At that time, the switch checks the arrangement information area of the IP-address request signal and, when no arrangement information is set in the area, sets the held arrangement information in the area. The switch also checks the physical port area. When no physical port information is set in the area, the switch sets information (a port number) of the port through which the signal has been received therein and then transfers the signal. When the arrangement information is set in the arrangement information area and the physical port information is set in the physical port area, the switch transfers the signal as it is.

Figure 10:
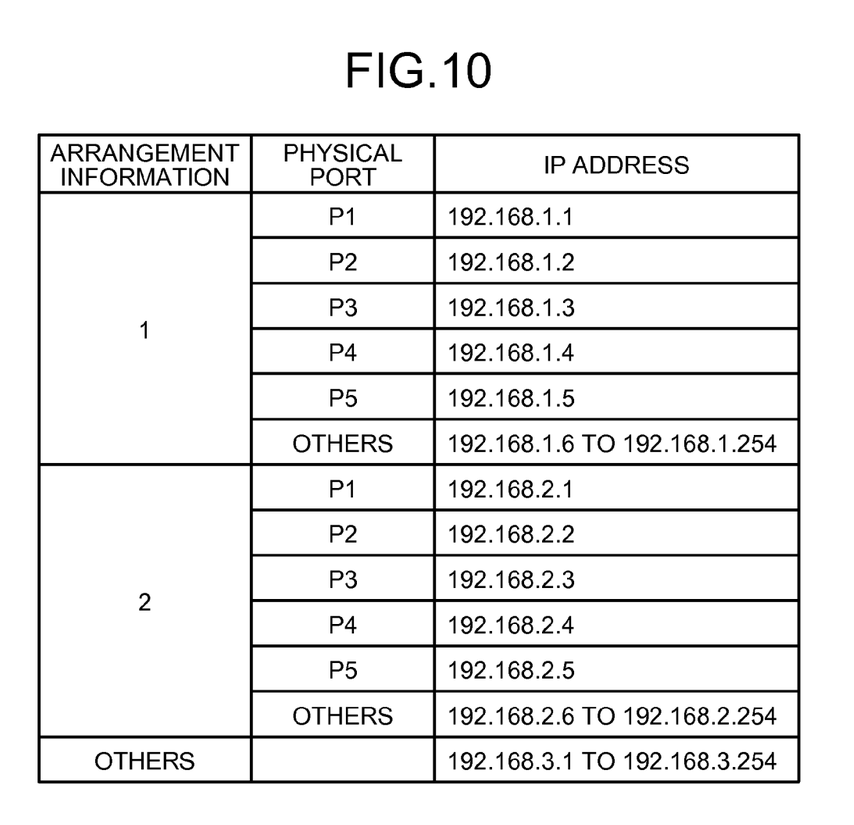
FIG. 10 is an example of an IP-address correspondence table.

Upon reception of the IP-address request signal, the IP address distribution apparatus 21 determines an IP address to be distributed based on the arrangement information and the physical port information set in the signal and the held IP-address correspondence table 28. Upon determination of an IP address, the IP address distribution apparatus 21 transmits an IP-address distribution signal in which the transmission source information set in the received IP-address request signal is set as the transmission destination information, unique information of the IP address distribution apparatus 11 is set as the transmission source information of the IP-address distribution signal, and the IP address to be distributed is set in the data area. Details of an operation performed by the IP address distribution apparatus 21 to determine an IP address to be distributed are explained below.

FIG. 10 is an example of the IP-address correspondence table 28 held in the IP address distribution apparatus 21. Assuming that a value of the arrangement information set in a received IP-address request signal is "k" and a value of the physical port information is "Pj", the IP address distribution apparatus 21 assigns an IP address "192.168.k.j" to a device as the transmission source of the IP-address request signal when k=1 or 2 and j=1, 2, 3, 4, or 5. When the value (k) of the arrangement information of the received IP-address request signal is other than "1" and "2", undistributed one of IP addresses "192.168.3.1 to 192.168.3.254" is selected and assigned. When the value (k) of the arrangement information of the received IP-address request signal is "1" or "2" and the value (j) of the physical port information is other than "1" to "5", undistributed one of IP addresses "192.168.k.6 to 192.168.k.254" is selected and assigned.

The IP address distribution system according to the present embodiment is applicable to a network established in a train, as in the second embodiment.

While an example in which an IP address is uniquely associated with a combination of the arrangement information and the physical port information has been explained in the present embodiment, a plurality of IP addresses can be assigned to a combination of the arrangement information and the physical port information to distribute the IP addresses to a plurality of devices using passage of an IP-address request signal through a physical port of a switch as a criterion. That is, for example, when a certain physical port of a switch is connected to another switch (a normal switch that holds therein no arrangement information) and a plurality of devices are connected via the normal switch, a set of relevant IP addresses can be distributed to the devices.

As described above, in the IP address distribution system according to the present embodiment, upon reception of an IP-address request signal, each of the switches transfers the IP-address request signal after adding the arrangement information thereof and the information of a physical port through which the IP-address request signal has been received if necessary. The IP address distribution apparatus distributes an IP address corresponding to the device information and the physical port information attached to the received IP-address request signal. Accordingly, to a device as a request source of an IP address, an IP address corresponding to the installation position of the request source device and a physical port of a switch to which the device is connected can be distributed. As a result, for example, when replacement of a device has taken place, an IP address, which is the same as the IP address provided to the device before the replacement, can be provided to a device after the replacement.

INDUSTRIAL APPLICABILITY

As described above, the IP address distribution system according to the present invention is useful when it is necessary to manage and assign IP addresses while considering a physical configuration of a network.

REFERENCE SIGNS LIST

1, 11, 21 IP address distribution apparatus
2, 3, 4, 12, 13, 14, 15, 22, 23 switch
5, 6, 7, 8, 24, 25, 26, 27 device
9, 28 IP-address correspondence table
16, 18 air conditioner (AC)
17, 19 braking device (BR)

The invention claimed is:

1. An IP address distribution system comprising:
a network including a plurality of switch apparatuses; and
an IP address distribution apparatus connected to the network,
wherein each of the switch apparatuses holds arrangement information that indicates a position thereof in the network, and when receiving an IP-address request signal from a device in the network, checks whether the arrangement information is added to the received IP-address request signal and when no arrangement information is added thereto, adds the held arrangement information to the IP-address request signal and transfers the IP-address request signal; and
wherein when receiving an IP-address request signal, the IP address distribution apparatus selects an IP address from a range corresponding to the arrangement information added to the signal and distributes the selected IP address to a request source device.

2. The IP address distribution system according to claim 1, wherein the IP address distribution apparatus distributes an IP address in a range differing according to a set value in the arrangement information.

3. The IP address distribution system according to claim 1,
wherein the device adds information indicating a device type thereof to an IP-address request signal and transmits the signal when requesting assignment of an IP address; and
wherein when receiving the IP-address request signal, the IP address distribution apparatus selects an IP address from a range corresponding to the arrangement information added to the signal and the information indicating a device type and distributes the selected IP address to a request source device.

4. The IP address distribution system according to claim 3, wherein the IP address distribution apparatus distributes an IP address in a range differing according to a combination of a set value in the arrangement information and the device type.

5. The IP address distribution system according to claim 1,
wherein when receiving an IP-address request signal from a device connected thereto, each of the switch apparatuses adds the arrangement information and information of a physical port through which the IP-address request signal has been received and transfers the signal; and
wherein when receiving an IP-address request signal, the IP address distribution apparatus selects an IP address from a range corresponding to the arrangement information added to the signal and the information of a physical port and distributes the selected IP address to a request source device.

6. The IP address distribution system according to claim 5, wherein the IP address distribution apparatus distributes an IP address in a range differing in a combination of a set value in the arrangement information and the physical port.

7. The IP address distribution system according to claim 1, wherein the network is a network established in a train.

8. The IP address distribution system according to claim 7, wherein the switch apparatus holds, as the arrangement information, information of a position in a train formation of a car in which the switch apparatus is installed.

9. An IP address distribution method in a system with a configuration that includes a network having a plurality of switch apparatuses and an IP address distribution apparatus connected to the network, each of the switch apparatuses holding arrangement information indicating a position thereof in the network, the IP address distribution method comprising:

a transfer step of checking, when each of the switch apparatuses receives an IP-address request signal from a device in the network, whether the arrangement information is added to the received IP-address request signal, and transferring, when no arrangement information is added to the received IP-address request signal, the received IP-address request signal with the held arrangement information added to the IP-address request signal; and
an IP-address distribution step of distributing, when the IP address distribution apparatus receives an IP-address request signal transferred from one of the switch apparatuses, to a request source device an IP address selected from a range corresponding to the arrangement information added to the received IP-address request signal.

10. The IP address distribution method according to claim 9, further comprising:
a request-signal transmission step of transmitting an IP-address request signal with information indicating a device type of the device added by the device to the IP-address request signal,
wherein, in the IP-address distribution step, an IP address is selected from a range corresponding to the arrangement information added to the IP-address request signal and the information indicating a device type and is distributed to a request source device.

11. The IP address distribution method according to claim 9,
wherein, in the transfer step, information of a physical port through which the IP-address request signal has been received is added together with the arrangement information to the IP-address request signal to be transferred; and
wherein, in the IP-address distribution step, an IP address is selected from a range corresponding to the arrangement information added to the IP-address request signal and the information of a physical port and is distributed to a request source device.

12. The IP address distribution method according to claim 9, wherein the network is a network established in a train.

13. The IP address distribution method according to claim 12, wherein the switch apparatus holds, as the arrangement information, information of a position in a train formation of a vehicle in which the switch apparatus is installed.

* * * * *